United States Patent [19]
Ozeki

[11] Patent Number: 4,724,956
[45] Date of Patent: Feb. 16, 1988

[54] INFORMATION RECORDING CARRIER-HOLDING SHEET

[75] Inventor: Jiro Ozeki, Tokyo, Japan

[73] Assignee: Slidex Corporation, Tokyo, Japan

[21] Appl. No.: 824,854

[22] Filed: Jan. 31, 1986

[30] Foreign Application Priority Data

Nov. 27, 1985 [JP] Japan .................. 60-265086

[51] Int. Cl.[4] .................. B65D 1/36; B65D 85/16
[52] U.S. Cl. .................. 206/307; 40/159; 206/0.84; 206/444; 206/456
[58] Field of Search .................. 40/158 R, 158 B, 159, 40/307; 206/455, 456, 564, 0.82, 0.84, 444, 309

[56] References Cited

U.S. PATENT DOCUMENTS

| | | | |
|---|---|---|---|
| 3,277,598 | 10/1966 | Lightburn | 40/158 R |
| 3,727,334 | 4/1973 | Sakamoto | 40/158 R |
| 4,193,218 | 3/1980 | Mermelstein | 40/158 B |
| 4,202,122 | 5/1980 | Namiki | 40/158 |
| 4,207,980 | 6/1980 | Namiki | 206/456 |
| 4,236,635 | 12/1980 | Namiki | 206/456 |
| 4,425,997 | 1/1984 | Grant | 206/0.84 |
| 4,427,727 | 1/1984 | Ozeki | 206/456 |
| 4,676,374 | 1/1987 | Wilkins | 206/455 |

FOREIGN PATENT DOCUMENTS 3413328 10/1984 Fed. Rep. of Germany .

Primary Examiner—Jimmy G. Foster
Attorney, Agent, or Firm—Fleit, Jacobson, Cohn & Price

[57] ABSTRACT

An information recording carrier-holding sheet in which laterally and vertically extending partition walls are formed in a single rigid resin sheet to form a plurality of rectangular depressions for allowing information recording carriers to be housed therein. Planar lugs are formed on the opposite side walls of each of the rectangular depression while projecting from almost the central portions of the opposite side walls in the longitudinal direction thereof to the inside of the rectangular depression. Guide members for guiding the movement of the information recording carrier in the rectangular depression are provided at the planar lugs in each of the rectangular depressions or in the vicinity thereof.

15 Claims, 10 Drawing Figures

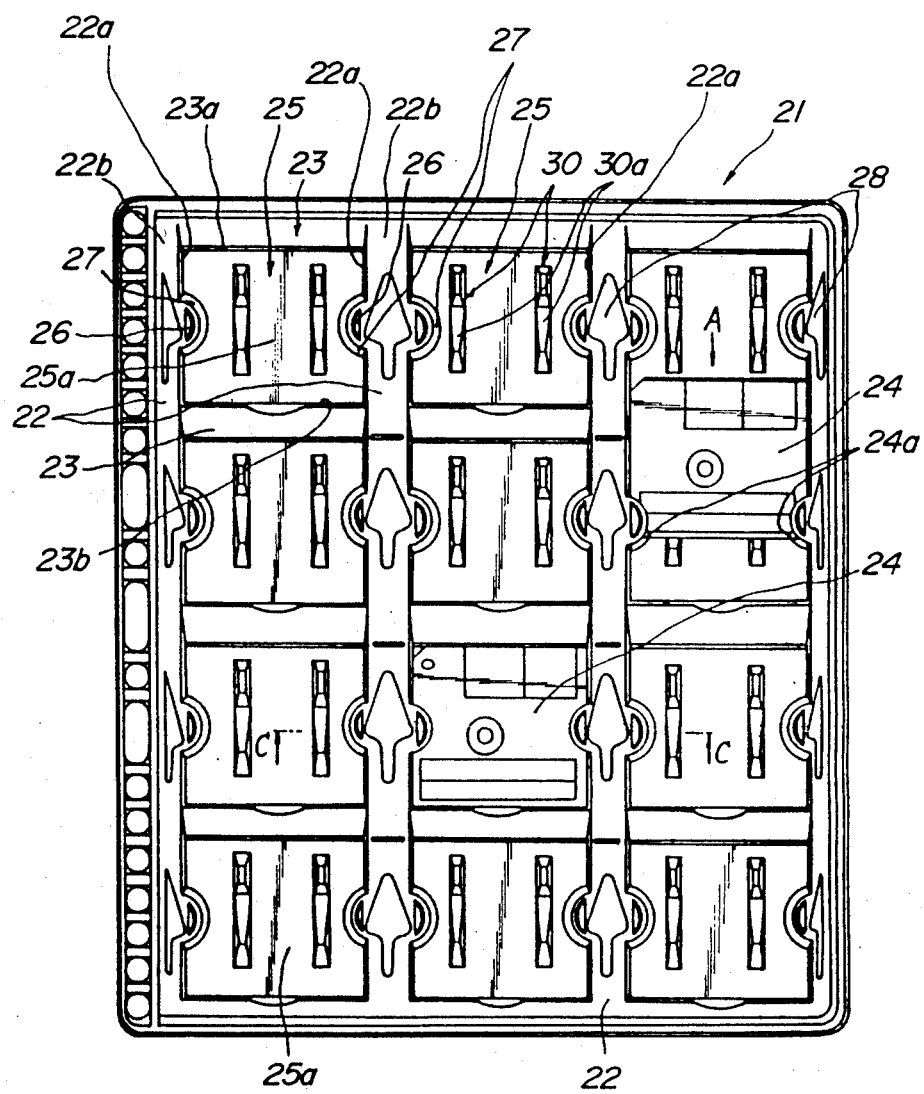
FIG_1a

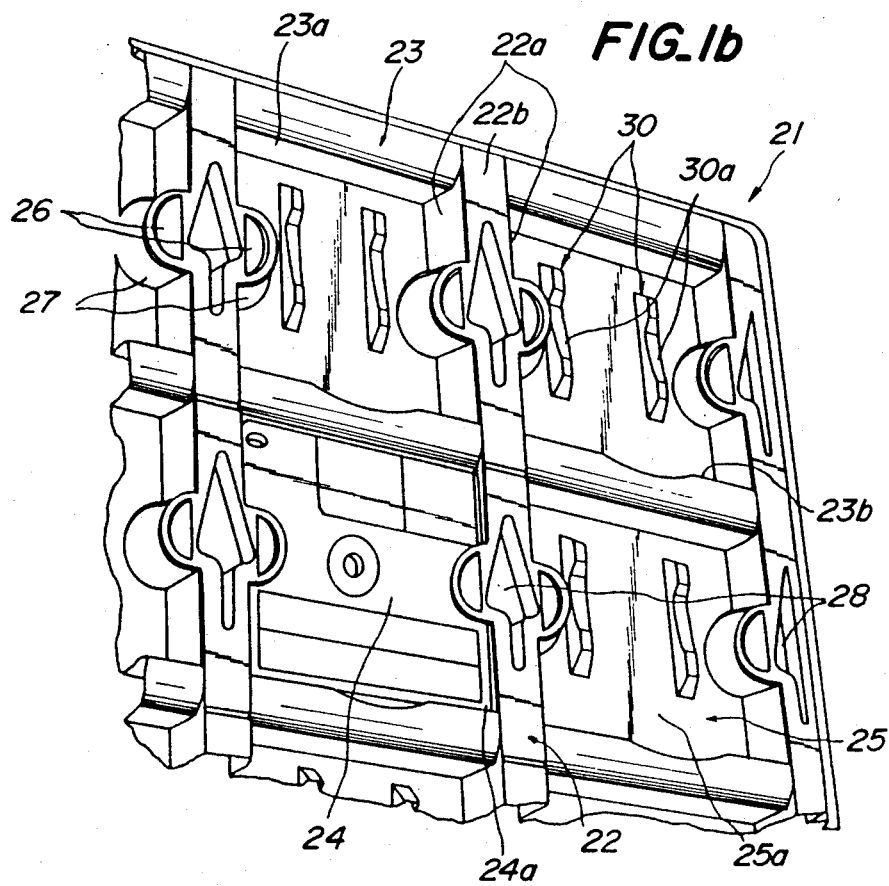
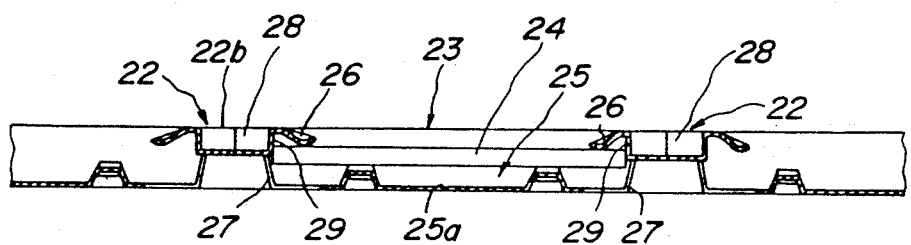

FIG_2a
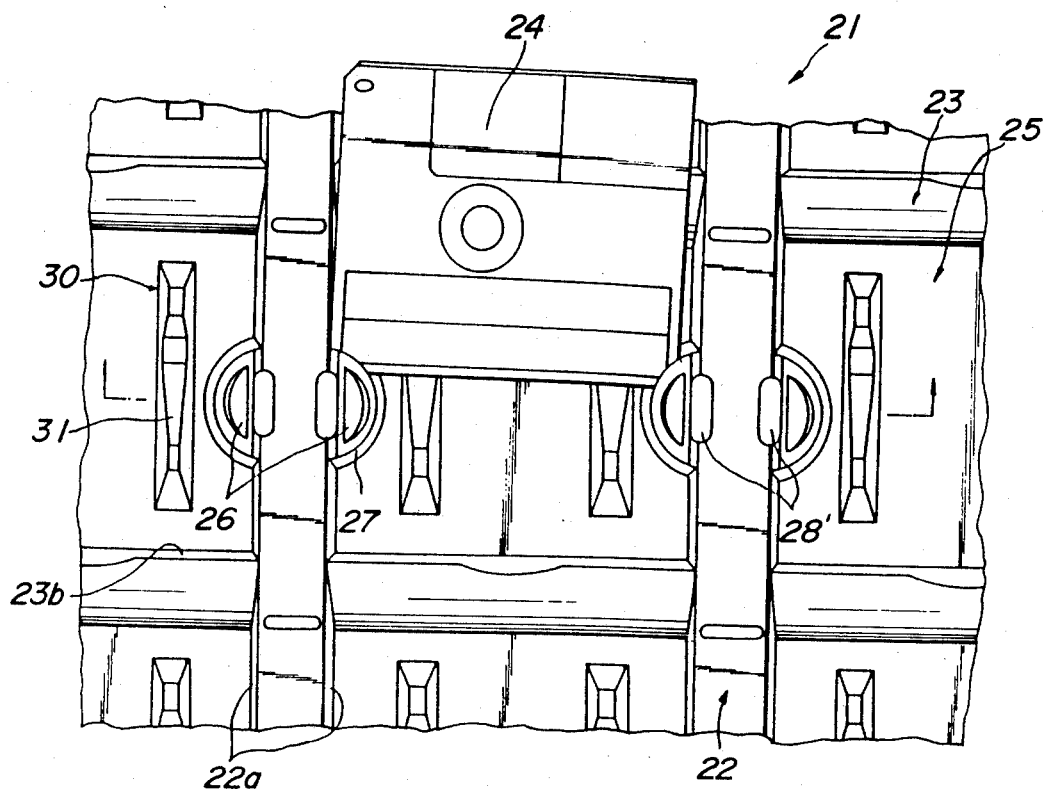
FIG_2b
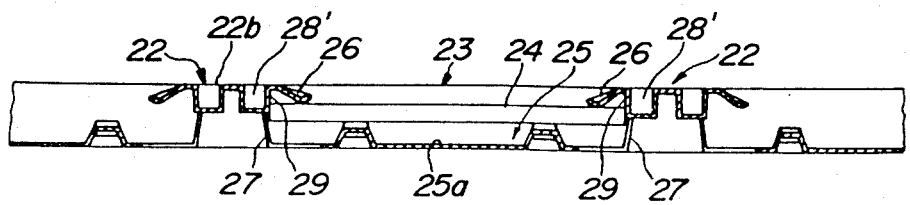

FIG_3
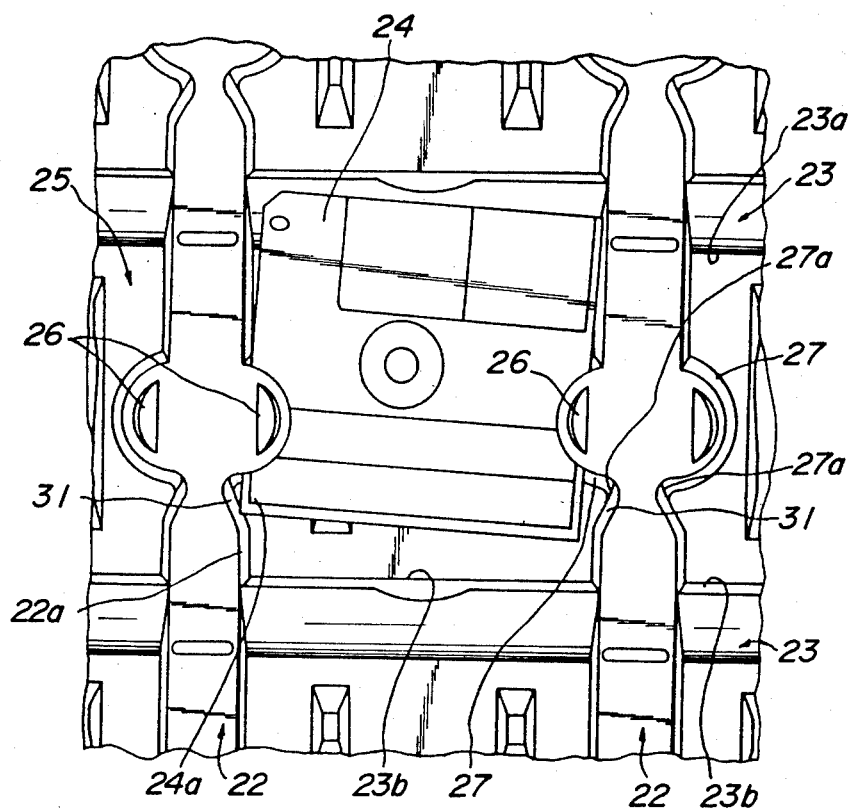

FIG_4a
PRIOR ART
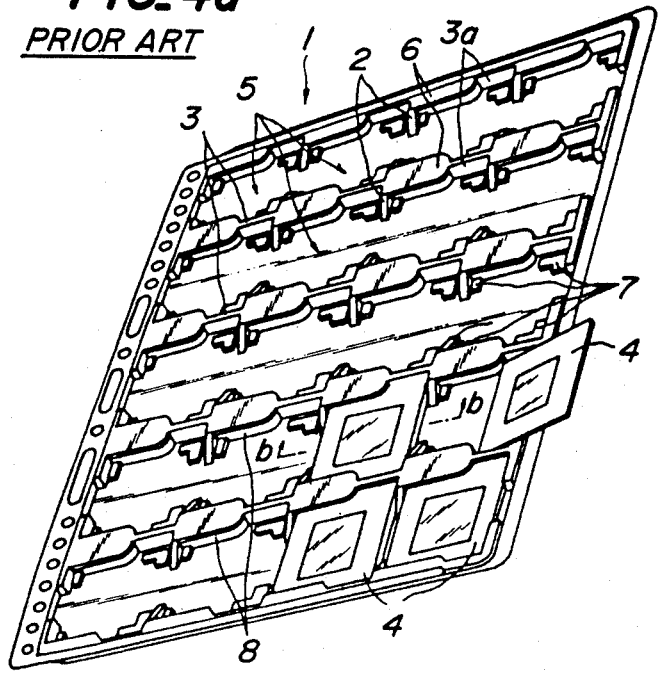
FIG_4b
PRIOR ART
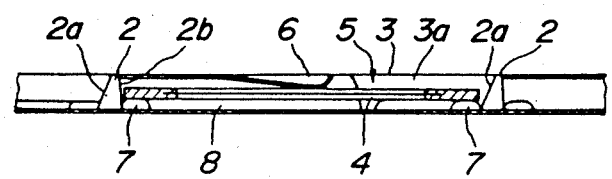

INFORMATION RECORDING CARRIER-HOLDING SHEET

BACKGROUND OF THE INVENTION

1. Field of the Invention

The present invention relates to a high strength information recording carrier-holding sheet which can extremely smoothly house small size of thin information recording carriers such as floppy disks, slide films and so on.

2. Related Art Statement

As heretofore widely used holding sheets for arranging and storing paper mount-attached slide films as one example of the information recording carriers, for instance, there is a holding sheet shown in FIGS. 4(a) and 4(b).

According to this holding sheet, plural intermittently extending vertical partition walls 2 and plural continuously extending lateral partition walls 3 are formed in a hard plastic sheet through press molding to define a plurality of vertically and laterally arrayed rectangular depressions 5 which are capable of housing mount-attached slide films 4 of 35 mm, and planar lugs 6 are cut and raised from side walls 3a, and 3a of the opposed lateral partition walls of the rectangular depression to project into the inside of the rectangular depressions 5 while being extended up to the vertical partition walls 2.

In order to protect an emulsion-attached sheet of the slide film 4 against deformation of the bottom wall of the rectangular depression 5, this holding sheet is provided with supports 7 slightly rising at the four corners of the bottom wall of each of the depressions. Further, in order to facilitate the insertion of the slide film 4 held by two fingers into the rectangular depression 5 as well as the removal of the former from the latter, the vertical partition walls 3 are discontinued in the central portion of the depression 5 and the wall face of the vertical partition wall 2 opposed to the wall face to which the planar lugs 6 are connected is designed as an upwardly inclined surface 2a.

The insertion of the slide films 4 into the respective rectangular depressions of the holding sheet 1 is performed such that as shown in FIG. 4(a), one end of the slide film is positioned in the rectangular depression from the vertical partition wall provided with the inclined face 2a, and then the slide film is pushed thereinto until the other end of the slide film 4 is completely inserted into the rectangular depression. Consequently, the slide film 4 is supported onto the supports while being pushed down by means of the planar lugs as shown in FIG. 4(b).

Incidentally, the slide film 4 can be extremely easily removed from the rectangular depression 5 such that one end of the slide film 4 is pushed on the side of the vertical partition wall opposed to the vertical wall 2 provided with the inclined surface 2a to make the other end of the slide film 4 ride over the inclined surface 2a against the elastic forces of the planar lugs 6, 6 and further cause this other end and the near portion thereof to ride over the vertical partition wall 2, thereby releasing the restraint of the slide film by the planar lugs 6, 6.

However, according to such a prior art technique, the planar lugs 6, 6 are formed in a single plastic sheet while extending from the lateral partition walls 3 to the vertical partition wall 2, and long cut holes 8 for raising the planar lugs 6 which holes extend from the side wall 3a of the lateral partition wall to the side wall 2b of the vertical partition wall while extending up to the bottom wall of the rectangular depression are obliged to be provided under the lower side of the planar lugs for the formation of the planar lug 6. Therefore, the rigidity of the holding sheet 1 is lowered by long cut holes 8 present at two per one rectangular depression 4, so that when the holding sheet 1 housing a number of the slide films 4 is lifted by holding, for instance, one corner or one side of the holding sheet 1, the holding sheet 1 is largely bent. Thus, there is a fear that the emulsion face of the slide film 4 is damaged by the bottom wall of the rectangular depression 5. In addition, there is also a problem that stress concentration occurs at the edge portion of the cut hole 8, and the holding sheet begins to be damaged from this edge portion at a relatively earlier stage.

This is more serious particularly in the case of an information recording carrier which has a relatively larger weight than the paper-mount attached slide film 4, for instance, a small size of floppy disk housed in a plastic case, a glass film in which a mount is attached to a slide film held between glass sheets, and so on.

In order to solve such problems, it has been proposed that the size of the cut holes are each made smaller by, as shown in FIGS. 5(a) and 5(b), forming the planar lugs 16 and 16 in the substantially central portions of the opposed vertical partition walls 12 in each of the rectangular depressions 15 defined by the lateral and vertical partition walls 12 and 13 to increase the rigidity of the holding sheet 1.

Problems to be solved by the invention

According to such a proposed technique, however, there is a problem that since the cut holes 18 are located in the midway of inserting the floppy disk 14 as an example of the information recording carriers into the rectangular depression 15, when the floppy disk 14 is inclined in either direction during the insertion of the floppy disk 14 into the rectangular depression 15, for instance, as shown in the figure, one of corner portions, 14a of the floppy disk 14, on the insertion side abuts against the edge portion 18a of the cut hole 18 to make further insertion of the floppy disk 14 impossible. Once the abutment occurs, it is necessary that the floppy disk 14 is pulled back to the insertion side and then inserted again after the posture of the slide film is corrected.

SUMMARY OF THE INVENTION

It is an object of the present invention to advantageously solve the above problems, and to provide an information recording carrier-holding sheet which enables smooth insertion of the information recording carriers while the rigidity of the holding sheet being increased.

According to the present invention, there is a provision of an information recording carrier-holding sheet in which laterally and vertically extending partition walls are formed in a single rigid resin sheet to thereby form a plurality of rectangular depressions for allowing information recording carriers to be housed therein; planar lugs are formed on the opposite side walls of each of the rectangular depressions while projecting from almost the central portions of the opposite side walls in the longitudinal direction thereof to the inside of the rectangular depression; and a guide member for guiding the movement of the information recording carrier in the rectangular depression is provided at each of the planar lugs or in the vicinity thereof.

Function

According to the information recording carrier-holding sheet of the present invention, since the planar lugs almost similar to those of FIG. 5 are formed at the opposed two side walls, the size of the cut holes necessary for the formation of the planar lugs can be fully reduced, so that the rigidity of the whole holding sheet can be increased while the durability thereof can also be enhanced.

Since the movement of the information recording carrier is guided in an appropriate direction by means of the guide members which are provided at the planar lugs or the near portions thereof to contribute to the partial definition of the rectangular depression, if the information recording carrier is being inserted into the rectangular depression in an inclined state, the insertion posture of the information recording carrier is corrected into a correct one through abutting between the guide member and the corner of the information recording carrier on the insertion side. Thus, the information recording carrier can be extremely smoothly inserted into the rectangular depression without being abutting against the edge portion of the cut hole irrespective of the inserting posture of the carrier into the rectangular depression.

These and other objects, features, and advantages of the invention will be well appreciated upon reading of the following description of the invention when taken in connection with the attached drawings with understanding that some modifications, variations and changes of the same could be easily done by the skilled in the art to which the invention pertains without departing from the spirit of the invention or the scope of claims appended hereto.

BRIEF DESCRIPTION OF THE DRAWINGS

For better understanding of the invention, reference is made to the attached drawings, wherein:

FIG. 1(a) is a plane view showing an embodiment according to the present invention;

FIGS. 1(b) and 1(c) are partially enlarged perspective views of FIG. 1(a) and a sectional view of FIG. 1(a) taken along a line C—C, respectively;

FIGS. 2(a) and 2(b) are partially enlarged views of another embodiment according to the present invention;

FIG. 3 is a partially enlarged view of another embodiment according to the present invention;

FIGS. 4(a) and 4(b) are a perspective view and a partially enlarged view showing a conventional example, respectively.

DETAILED DESCRIPTION OF THE INVENTION

Figure 5A:
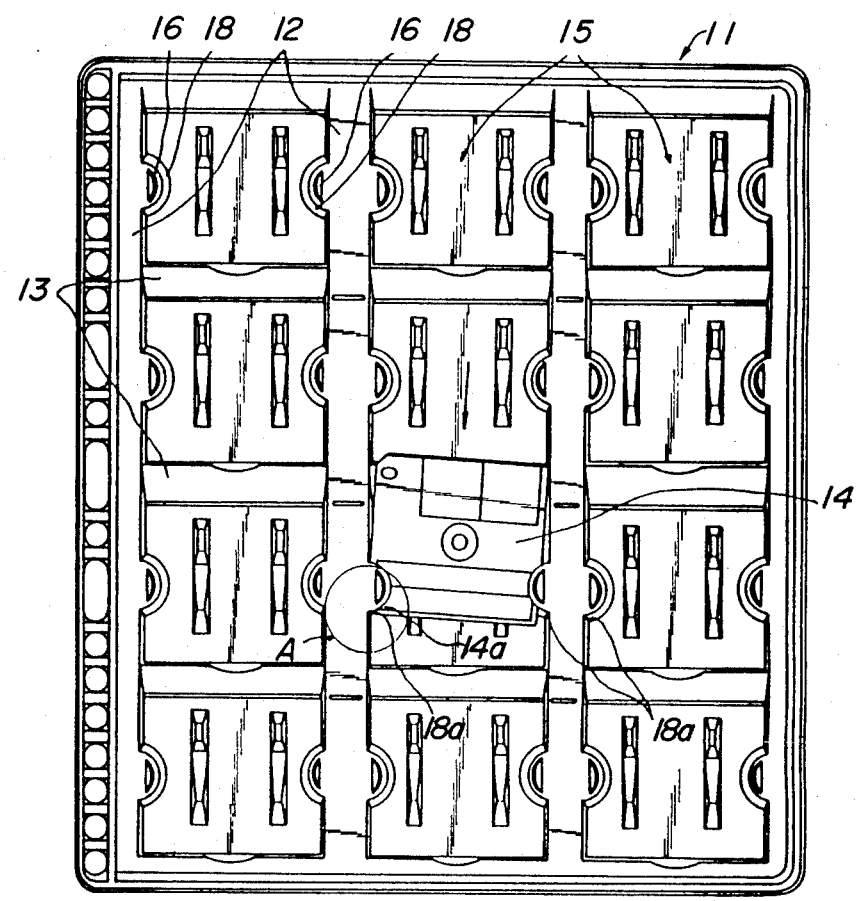
FIGS. 5(a) and 5(b) are a plane view and a partially enlarged view of a technique trially concieved by the inventor, respectively.
Figure 5B:
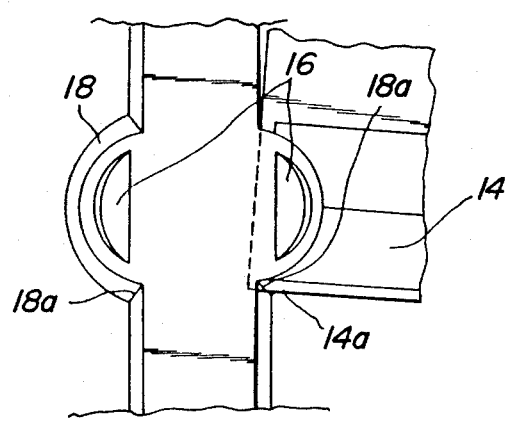

The invention will be explained below with reference to the attached drawings with the same reference numerals being used to describe the same elements used in the different Figures.

FIG. 1 is a view showing an embodiment according to the present invention. In this figure, reference numerals 21, 22 and 23 show the whole holding sheet, a vertical partition wall, and a lateral partition wall, respectively.

In this embodiment, a plurality of rectangular depressions 25 for housing floppy disks 24 as an example of information recording carriers are defined by the vertical partition walls 22 and the lateral partition walls 23 formed in a single synthetic resin sheet.

In FIG. 1, planar lugs 26, 26, are formed in the side walls 22a of the opposed vertical partition walls of the rectangular depression 25 surrounded by the peripheral walls substantially perpendicular to the bottom wall, while projecting to the inside of the rectangular depression 25 in the central portion of the side walls of the opposed vertical partition walls. These planar lugs 26 and 26 function to apply a given dowward pushing force upon the floppy disk 24 inserted into the rectangular depression 25. Since such function can be enhanced as desired, for instance, by slanting the planar lugs 26 and 26 in such directions that the tip ends thereof may approach the bottom wall of the depression, the projecting length of the planar lugs 26 and 26 and the length at which the planar lugs 26, 26 extend in the length direction of the side walls 22a can be made sufficiently short so long as the durability of the planar lugs is not deteriorated in repeated use.

Therefore, cut holes 27 and 27 bored at the bottom wall 25 of the depression and side walls 22a of the vertical partition walls for the formation of the planar lugs 26, 26 can be made extremely smaller as compared with those as shown in FIG. 4, so that the rigidity of the holding sheet 21 can be effectively prevented from being reduced.

In this embodiment, a recess portion 28 in an arrowhead shape (a half cut profile of an arrowhead in the case of the vertical partition wall 22 located at the edge portion of the hold sheet 21) of which tip portion is directed to the inlet side for the floppy disk 24 is formed at a location corresponding to the position at which the planar lug 26 is formed and at the top flat face of the vertical partition wall 22. As obvious from the sectional view of FIG. 1(c), the rear face of the recess 28 is adjacent to the side portion of the planar lug 26 and partially projects to the inside of the cut hole 27. A guide member 29 partially constituting the rectangular depression 25 is partially defined by a part of this projection. By locating the guide member 29 at the central portion in the extending direction of the planar lug 26, this guide member 29 so function that the corner on the insertion side of the floppy disk 24 being inserted into the rectangular depression 25 is prevented from projecting to the outside of the rectangular depression 25 through the cut hole 27, and the inserting posture of the floppy disk can be gradually corrected.

In the illustrated embodiment, the planar profile of the recess 28 can be appropriately modified upon necessity. For instance, the planar profile of the recess 28 can be made circular, elliptical, polygonal, etc. in addition to the long circular shape recess 28' shown in FIGS. 2(a) and 2(b). Further, the recess-forming location may be upside of the planar lug, the insertion side of the floppy disk, or the opposite side thereof.

Further, in the embodiment shown in FIGS. 1(a), 1(b), and 1(c) and 2(a) and 2(b), the wall face 23a on the insertion side of the lateral partition wall 23 from which the floppy disk 24 is inserted and the wall face 23b on the reaching side opposed to the wall face 23a are both formed substantially perpendicularly to the bottom wall 25a of the depression; two rows of the supports 30, 30 extending in parallel with the vertical partition walls 22 are formed at the bottom walls 25a of the depression, while the edges of the supports 30, 30 near the wall face on the reaching side are spaced from the reaching face at a specific interval. The perpendicular opposite wall faces 23a and 23b function to assuredly prevent the floppy disk 24 inserted into the rectangular depression 25 from accidentally slipping off therefrom. The supports 30, 30 allow the floppy disk 24 held between the supports 30, 30 and the planar lugs 26, 26 in the rectangular depression 25 to turn around tip edges of the supports 30, 30 as fulcrum due to a pushing down force toward the near portion of the wall face on the reaching side. On the other hand, both the supports 30, 30 have enough extending length to hold the floppy disk 24 in a stable posture. The intermediate portions of the supports 30, 30 are provided with depressions 30a, 30a for facilitating the floppy disk 24 to enter the underside of the planar lugs in the initial insertion stage of the floppy fisk 24 into the depression 25.

The information recording carrier-holding sheet according to the present invention may be integrally produced from a synthetic resin through molding.

The housing and holding of the floppy disk 24 into the thus constituted holding sheet 21 can be easily performed such that first, as shown in FIG. 1(a), one edge of the floppy disk 24 is positioned on the depressions 30a, 30a of the supports 30, 30, and then, the other edge portion is pushed toward the inside of the rectangular depression 25 as shown by an arrow A to place the floppy disk 24 under the both the planar lugs 26, thereby completely advancing the floppy disk 24 into the rectangular depression 25.

While the floppy disk 24 is housed and held in such a manner, for instance, if the floppy disk is being inserted into the rectangular depression 25 in a slanted posture in either direction, the inserted posture of the floppy disk 24 is corrected when the guide member 29 contacts with the corner 24a on the insertng side of the floppy disk. Therefore, unlike in the conventional techniques, there is completely no fear that the corner portion 24a projects to the outside of the rectangular depression 25 from the cut hole 27 and abuts against the edge portion of the cut hole.

Therefore, according to the illustrated embodiment, the rigidity and the resulting durability of the holding sheet 21 can not only be enhanced, but also the insertion of the information recording carrier can be made extremely smooth.

On the other hand, the inserted floppy disk 24 can be extremely easily removed from the rectangular depression 25 such that the floppy disk 24 is first pushed down, that is, toward the bottom wall of the depression in the vicinity of the wall face on the reaching side to turn the floppy disk 24 around the tip ends of the supports 30 as fulcrum on the side of the wall face 23b and float the other end portion of the floppy disk preferably higher than the height of the wall face 23 on the inserting side, and then while this floating state is kept, the floppy disk 24 is pushed toward the wall face 23a of the inserting side to make the other end portion of the floppy disk 24 to ride over the wall face on the inserting side so that the floppy disk 24 is gradually removed from the planar lugs.

FIG. 3 is a plane view showing another embodiment according to the present invention in which a guide member 31 is formed in the vertical partition walls 22.

In this embodiment, the guide members 31 are formed by largely extending the cut hole 27 toward the vertical partition wall 22 of the planar lug on the side of the wall face 23b and connecting the edge portion 27a of the cut hole 27 and the side wall 22a of the vertical partition wall 22 through an inclined wall slanted in a direction of narrowing the width of the rectangular depression 25. The guide member 31 also functions to correct the inserting posture of the floppy disk 24 under the action of the inclined wall when the corner portion 24a on the inserting side of the floppy disk 24 contacts the guide member as shown.

While the present invention has been explained on the basis of the embodiments shown in the attached drawings, the planar lugs can be formed in the side walls of the lateral partition walls. In addition, the guide member can be provided nearer to the wall face on the inserting side than the planar lug. By so constructing, the inserting posture can be corrected before the corners of the information recording carrier on the insertion side reach the planar lugs.

Effects of the Invention

Therefore, according to the present invention, the planar lugs are formed at the substantially central positions of the opposite two side walls in each of the rectangular depressions, so that the cut holes can be sufficiently small to extremely enhance the rigidity of the holding sheet and the durability of the holding sheet. Further, the information recording carrier can be extremely smoothly and quickly inserted into the rectangular depression by the provision of the guide members, which contribute to the partial definition of the rectangular depression, at the planar lugs or in the vicinity thereof.

What is claimed is:

1. An information recording carrier-holding sheet for holding an information recording carrier having a top and a bottom planar surfaces interconnected by side edge surfaces, said sheet comprising
    a single rigid resin sheet including partition walls;
    a plurality of rectangular depressions formed by said partition walls for housing information recording carriers therein, each rectangular depression including two sets of opposing ones of said partition walls;
    planar lugs formed on one set of said two sets of opposing partition walls, said planar lugs projecting from central portions of said one set of opposing partition walls in a direction toward each other;
    holes formed in said resin sheet, each one of said holes being located directly beneath each one of said lugs such that each of said holes is located at least partially in the respective partition walls from which lugs are formed, each of said holes being located beneath a lug which includes a trailing edge located in the partition wall, each of said holes being located remote from the other of said two sets of partition walls of a respective depression; and
    means formed by portions of said one set of partition walls including a guide member for contacting and guiding the side edge surface of an information recording carrier into each rectangular depression so as to prevent said carrier from abutting said trailing edge of a respective hole when said carrier is guided across said respective hole toward said trailing edge thereof and beyond said trailing edge thereof.

2. An information recording carrier-holding sheet according to claim 1, wherein each of said rectangular depressions includes a bottom wall, and a tip end of each of said planar lugs is inclined toward said bottom wall of each of the depressions.

3. An information recording carrier-holding sheet according to claim 1, wherein said each partition wall includes a top face and a projection having an outer periphery forming one of said guide members, said guide members being formed depressed from said top face.

4. An information recording carrier-holding sheet according to claim 3, wherein said projection has a horizontally sectional profile.

5. An information recording carrier-holding sheet according to claim 1, wherein each of said rectangular depressions includes a bottom wall and two rows of supports provided on said bottom wall.

6. An information recording carrier-holding sheet according to claim 5, wherein said two rows of supports each includes an upper face and a depression is formed on each said upper face.

7. An information recording carrier-holding sheet according to claim 1, wherein said sheet is integrally formed from a synthetic plastic through molding.

8. An information recording carrier-holding sheet according to claim 1, wherein each of said guide members is an oblique wall extending from a portion of each of said one set of partition walls.

9. An information recording carrier-holding sheet for holding an information recording carrier having a top and a bottom interconnected by side surfaces, said sheet comprising:
   a single rigid resin sheet including partition walls;
   a plurality of rectangular depressions formed by said partition walls for housing information recording carriers therein, each rectangular depression including two sets of opposing ones of said partition walls;
   planar lugs formed on one set of said two sets of opposing partition walls, said planar lugs projecting from central portions of said one set of opposing partition walls in a direction toward each other; and
   guide members being located for contacting and guiding the movement of the side surfaces of the information recording carrier in each of the rectangular depressions, one of said guide members being provided adjacent each of the planar lugs and being formed by a part of a recessed portion formed depressed from a top face of each of said one set of partition walls.

10. An information recording carrier-holding sheet according to claim 9, wherein each of said rectangular depressions includes a bottom wall, and a tip end of each of said planar lugs is inclined toward said bottom wall of each of the depressions.

11. An information recording carrier-holding sheet according to claim 9, wherein said recessed portion has a horizontally sectional profile.

12. An information recording carrier-holding sheet according to claim 9, wherein each of said rectangular depressions includes a bottom wall and two rows of supports are provided on said bottom wall.

13. An information recording carrier-holding sheet according to claim 12, wherein said two rows of supports each includes an upper face and a depression is formed on each said upper face.

14. An information recording carrier-holding sheet according to claim 9, wherein said sheet is integrally formed from a synthetic plastic through molding.

15. An information recording carrier-holding sheet according to claim 9, wherein each partition wall of said one set of partition walls includes a hole which forms said planar lug, and each of said guide members is an oblique wall extending from said recessed portion of each partition wall of said said one set of partition walls.

* * * * *